(12) United States Patent
Williams et al.

(10) Patent No.: US 10,600,106 B2
(45) Date of Patent: Mar. 24, 2020

(54) METHOD OF COMPARING GOODS OR SERVICES FROM ONE OR MORE WEBSITES

(71) Applicant: SKYSCANNER LIMITED, London (GB)

(72) Inventors: Gareth Williams, Edinburgh (GB); Nicholas Radcliffe, Bonnyrigg (GB)

(73) Assignee: SKYSCANNER LIMITED, London (GB)

(*) Notice: Subject to any disclaimer, the term of this patent is extended or adjusted under 35 U.S.C. 154(b) by 259 days.

(21) Appl. No.: 15/129,031

(22) PCT Filed: Mar. 24, 2015

(86) PCT No.: PCT/GB2015/050861
§ 371 (c)(1),
(2) Date: Sep. 26, 2016

(87) PCT Pub. No.: WO2015/145125
PCT Pub. Date: Oct. 1, 2015

(65) Prior Publication Data
US 2017/0124625 A1    May 4, 2017

(30) Foreign Application Priority Data
Mar. 24, 2014   (GB) .................................. 1405205.4

(51) Int. Cl.
*G06Q 30/00*   (2012.01)
*G06Q 30/06*   (2012.01)

(52) U.S. Cl.
CPC ......... *G06Q 30/0631* (2013.01); *G06Q 30/06* (2013.01)

(58) Field of Classification Search
None
See application file for complete search history.

(56) References Cited

U.S. PATENT DOCUMENTS

| 2002/0099929 | A1 | 7/2002 | Jin et al. |
| 2002/0178014 | A1 | 11/2002 | Alexander |

(Continued)

FOREIGN PATENT DOCUMENTS

| JP | 2001350787 A | 12/2001 |
| JP | 2002157444 A | 5/2002 |

(Continued)

OTHER PUBLICATIONS

International Search Report, dated May 4, 2015, issued in international Application No. PCT/GB2015/050861.

*Primary Examiner* — Mila Airapetian
(74) *Attorney, Agent, or Firm* — Saul Ewing Arnstein & Lehr LLP

(57) ABSTRACT

The field of the invention relates to methods and systems for comparing goods or services from websites, databases or other on-line resources. The field of the invention includes related servers, user terminals and computer program products. There is provided a method of comparing goods and/or services from one or more websites or other on-line resource(s) in which a multi-objective optimization process is used to identify a set of specific goods and/or services that optimally match user-defined and/or user-associated criteria and then that set of specific goods and/or services is displayed on an end-user's computing device to enable the end-user to view that set and optionally purchase one or more items from that set.

25 Claims, 7 Drawing Sheets

(56) References Cited

U.S. PATENT DOCUMENTS

| | | | |
|---|---|---|---|
| 2005/0187846 A1 | 8/2005 | Subbu et al. | |
| 2007/0192192 A1* | 8/2007 | Haberman | G06F 17/30017 705/14.1 |
| 2008/0015870 A1* | 1/2008 | Elowitz | G06Q 30/06 715/833 |
| 2008/0140577 A1* | 6/2008 | Rahman | G06Q 20/3829 705/71 |
| 2011/0112759 A1* | 5/2011 | Bast | G01C 21/3423 701/533 |
| 2013/0318063 A1* | 11/2013 | Ayzenshtat | G06F 16/951 707/707 |
| 2014/0108160 A1* | 4/2014 | Gluhovsky | G06Q 50/14 705/14.71 |
| 2015/0348069 A1* | 12/2015 | Fano | G06Q 10/087 705/7.31 |

FOREIGN PATENT DOCUMENTS

| | | |
|---|---|---|
| JP | 2003030288 A | 1/2003 |
| JP | 2004030413 A | 1/2004 |

* cited by examiner

METHOD OF COMPARING GOODS OR SERVICES FROM ONE OR MORE WEBSITES

CROSS REFERENCE TO RELATED APPLICATIONS

This application claims the priority of PCT/GB2015/050861, filed on Mar. 24, 2015, which claims the benefit of priority to Great Britain Application No, GB1405205.4, filed on Mar. 24, 2014, the entire contents of each of which are hilly incorporated herein by reference.

BACKGROUND OF THE INVENTION

1. Field of the Invention

The field of the invention relates to methods and systems for comparing goods or services from websites, databases or other on-line resources. The field of the invention includes related servers, user terminals and computer program products.

2. Technical Background

Here is some background on multi-objective optimization. Multi-objective optimization is an area of multiple criteria decision making that is concerned with mathematical optimization problems involving more than one objective function (or attribute) to be optimized simultaneously; improving one objective leads to a deterioration in one or more other objectives.

For example, when buying airline flights over the internet between specific origin and destinations, objectives could, in an implementation of this invention, include each and any of the following objectives: lowest price; shortest travel time; fewest stop-overs; departure times; arrival time; punctuality; risk of flight cancellation by the airline; whether a day or a night flight; highest quality airline; upgrade availability; upgrade price; seat comfort; wi-fi; lounge access; infotainment quality; loyalty program rewards; aircraft type; aircraft age; crowd-sourced ratings for the airline; crowd-sourced ratings for the specific flight or aspects of the flight; family friendliness; specific airport, where multiple airports serve the same origin and/or destination; brand compatibility.

As noted above, improving one objective leads to a deterioration in one or more other objectives. For example, improving the price objective can be obtained by deteriorating the shortest travel time objective (and indeed other objectives). Improving the upgrade price objective might be obtained at the cost of deteriorating the airline quality objective.

So when selecting flights, there is rarely a single solution that simultaneously optimizes all objectives; instead, customers might explicitly explore those objectives of most value to them (if they have time) but the challenge is that the sheer number of flight options is so great that choice can be bewildering and confidence that one has discovered the optimal flight can be elusive; this lack of confidence in identifying the flight that is 'best' for you can inhibit purchasing entirely—that is clearly frustrating to both potential customer and airline/flight broker etc. Applying a multi-objective optimization approach to the problem of identifying a small set of possible 'best' solutions (for example, 1, or 2, or 3 or 4 or 5 or 6, perhaps up to 10, different flights all of which are 'best' (e.g. that define the Pareto optimal front) is an effective solution to this dilemma.

Another advantage of this approach is that it is readily possible to in effect discard these 'best' solutions and then identify the next 'best' set of solutions (so for example the system could identify the top 10 'best' solutions using multi-objective optimization and solely display those flights, and not display at all the hundreds of other flights that might match the base criteria of origin/destination and dates. This limits the potential for customer bewilderment. If the customer cannot see the perfect flight in that list of the machine selected top 10, then he can ask for the next 'best' top 10 to be shown—the initial ten best are in effect discarded and the next top best, again located using a multi-objective optimization algorithm, are then shown.

Maintaining satisfied customers is a complex process of balancing competing objectives to yield potential flights that the customer will perceive as being optimal; these objectives are both wholly independent of the customer (e.g. price) and personal to the customer—for example, some customers place a very considerable weight on crowd-sourced reviews, others place no reliance at all on this objective; machine learning systems can profile individual customers to weight these objectives accordingly—for example, if the machine learning system determines that a customer actively Tweets about her travel experience, and has posted many TripAdvisor reviews, then the system would weight crowd-sourced aspects more highly than for the person with no on-line profile. If we take the 'brand-compatibility' objective, then a machine learning system could take the demographic profile of the customer (e.g. 25 year old urban male, working in the creative industries, extensive and rich on-line presence) and map that to the airline that is most compatible with that demographic profile.

Objectives can also be more broadly defined where a semantic engine can parse unstructured (e.g. free-text/free-speech) input for example, if a user inputs the search query "flights for a week somewhere with brilliant snow right now", then the objectives will include current snow conditions in ski resorts, and predicted snow conditions over the coming week.

Other aspects of the user's query may help define the quality metric, for example the free text "cheap flights to New York" implies increased flight price sensitivity, and a trip not spending Saturday at the destination may imply that it is for business purposes.

The same multi-factorial complexity applies to many other situations where goods or services are to be purchased—especially where the purchase is over the internet for example, if shopping for a shirt on-line, objectives could include any or all of: design; price; manufacturer's brand; retailer's brand; perceived quality of the shirt; fitting/sizing compatibility; fitting/sizing familiarity; ease of completing transaction; returns policy; loyalty scheme rewards.

Another example is the purchase of electronics, such as a projector. Attributes such as user and professional review ratings, resolution, brightness, contrast, guarantee, and underlying technology must be traded off against price in order to make an optimal decision.

In the selection of a hotel (or other accommodation), the quality of a particular option may be a function of user ratings, hotel stars, proximity to a desired location (e.g. for a meeting, or sightseeing), popularity/purchase rate, hotel chain brand value, hotel facilities, room facilities/type.

In the selection of a car rental, the parameters for ranking may include: vehicle type, location of pick-up and drop-off points, number of seats, fuel efficiency, extras (sat nav, free tank of fuel, child seat), rental company brand, vehicle features (manual/automatic, air conditioning).

For the selection of a package holiday (dynamic, or pre-composed) the number of parameters increases still further, and may include all those listed above for flights, accommodation, and car rentals, but include others specific to packages such as transfers, tours, inclusive meals, etc.

Multi-objective optimization is also known as multi-objective programming, vector optimization, multicriteria optimization, multiattribute optimization or Pareto optimization. Multi-objective optimization has been applied in many fields of science, including engineering, economics and logistics where optimal decisions need to be taken in the presence trade-offs between two or more conflicting objectives. But the application of this kind of optimization to the area of identifying different goods and services, made available on-line from multiple competing websites, has not been widely explored.

The above-described steps can be implemented using standard well-known programming techniques.

Another aspect of the invention is a computer implemented system and apparatus for comparing goods and/or services from one or more websites or other on-line resource(s) in which one or more processors are programmed to implement a multi-objective optimization process that is used to identify a set of specific goods and/or services that optimally match user-defined and/or user-associated criteria and then data defining that set of specific goods and/or services is sent from a server and then displayed on an end-user's computing device to enable the end-user to view that set and optionally purchase one or more items from that set.

The novelty of the above-described embodiments lies not in the specific programming techniques but in the use of the steps described to achieve the described results.

Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the Figures and discussion thereof support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The following patent application disclosures are incorporated by reference: PCT/GB2014/052846, PCT/GB2013/053261, EP 2088544 and U.S. application Ser. No. 14/103,016.

By way of example in the context of airfare flight pricing, flight pricing is conventionally obtained from a Global Distribution System (GDS). Flight comparison services, such as Skyscanner, and some airlines, pay a fee to obtain live, bookable prices from a GDS; these prices are the actual bookable prices that a potential passenger can book.

3. Discussion of Related Art

EP2395726B1 discloses a method and system for reducing protocol headers sent over a wireless network. The method includes receiving at a proxy server, from a mobile device, a protocol request device addressed to a remote system. The protocol request including defined headers and an enable-caching indicator. The proxy server stores at least one of the defined headers as cached headers and sends a protocol response to the mobile device identifying the cached headers. Subsequent requests from the mobile device are formatted as abridged requests that exclude the cached headers, thereby reducing the data transmitted. The proxy server adds the cached headers to the abridged requests before forwarding them as unabridged requests to the remote system.

EP1326406B1 improves the performance of distributed systems by reducing the amount of graphical data transmitted between an application server and a thin client. The invention provides a method and apparatus for efficiently reducing the amount of graphical data transmitted from a server to a client via a communications network, the method comprising the steps of: separating a path into a plurality of strips, each of the plurality of strips having a strip length and an absolute angle associated therewith; determining a quantized angle associated with the absolute angle for each of the plurality of strips; forming a protocol stream at the server, the protocol stream including a beginning coordinate of the path and the strip length and an indicia of the quantized angle of each of the plurality of strips; and transmitting the protocol stream from the server to the client via the communications network.

SUMMARY OF THE INVENTION

According to a first aspect of the invention, there is provided a method of comparing goods or services from one or more websites or other on-line resource(s) in which a multi-objective optimization process is used to identify a set of specific goods and/or services that optimally match user-defined and/or user-associated criteria and then that set of specific goods and/or services is displayed on an end-user's computing device to enable the end-user to view that set and optionally purchase one or more items from that set. An advantage is that an optimized set of goods and/or services may be transmitted more quickly to an end-user's computing device than a full set of goods and/or services, because the amount of data to be transmitted is reduced.

Optional features include any one or more of the following:

Pareto optimization may be used as the multi-objective optimization process and then the set of goods and services reside on or define the Pareto front or envelope; this typically requires de-composing the optimisation problem into determining the Pareto front in a 2-axis domain, for example, price v quality (or price v pain). Where a 2-axis domain is used, then a geometrical approach to identifying items on the Pareto front can be used to identify a single instance of the goods and services that is the 'best' (so the 'set' can include a set of a single instance. As an example, for flights, then a seat at a specific price from a specific airline from a specific origin and destination and for specific dates). One in effect minimizes the value of the objective on one axis (typically price) per unit of the item on the other axis (e.g. quality). Being able to identify a set of 'best' flights is especially useful where the possible choice of flights for a given origin and destination is quite complex, for example a mixture of direct flights, some flights with stops, with different seat categories available, and all provided by various airlines.

Conventional approaches to identifying and recommending the 'best' matches to a purchase query generally display the 'best' items, but together with a full listing of the residual items (often these will simply be price-ordered). With an implementation of this invention, only that set of the 'best' goods or services generated by the multi-objective optimization process is displayed on an end-user's computing device to enable the end-user to view that 'best' set; others items not in that 'best' set are not displayed.

Also, another innovative aspect of the invention is that 'best' set can be discarded, for example by an end-user initiated process, and the 'next best' set generated by the multi-objective optimization process (e.g. Pareto optimization) can then be displayed. So if the 'best' set is say the top 10 optimal matches, then the method initially displays those (and it may display only those and no others, to keep a simple and concise list of recommendations) but the user can choose to see what the next 10 best recommendations are, and so on, exploring further sets, each with a small number of items (say 10 or fewer), but never overwhelmed by a hugely extensive list. This enables the user to discover different but nevertheless sufficiently optimal alternatives, perhaps coming across a recommendation that would not have been identified by a more conventional approach.

The weighting or importance given to each of the different objectives can be varied in different ways:

automatically, depending on a specific user's history or demographic profile: we could have a machine learning system that looks at how the user has interacted previously when looking at goods or services to purchase—e.g. what kinds of characteristics tend to lead to greater progress to buying an item—for example, if searching a flight comparison engine, a user might show himself to always be more interested in flights from British Airways than Ryanair—in which case, flights from BA would be given a higher weighting than those from Ryan Air for that individual.

automatically, depending on attributes of the item sought—to continue the flight example, if the flight sought is for a family with young children over half-term, and one objective is 'family-friendliness', then that objective could be weighted more heavily.

automatically, depending on reported data—e.g. to continue the flight example, if flight punctuality is an objective, then reported statistics for punctuality for different airlines would affect the weighting or score for that objective for each airline.

Automatically, based on behavior of other users—e.g. the selections of other users could be used to derive the weighting or score for that user who is from a similar demographic, or running a similar query.

manually, with a user applying or setting various 'importance' weightings to various objectives (e.g. the UI could include slider bars in relation to various objectives to set a weighting that can vary along a scale (ie the system is not merely binary, unlike crude filters or check-boxes)).

This method may be applied to recommending (e.g. in a web-based price comparison site) a broad range of goods and services; flights, hotels, car-hire, but in addition virtually any other item or service that can be purchased on line and that can be defined by multiple, competing objectives or attributes.

The method may be implemented in a price comparison service, such as a dedicated price comparison site like Skyscanner.net, in which case optimal flights, hotels, car-hire recommendations are provided directly on the Skyscanner.net website, and the end-user may then be taken to a different website to actually purchase the flights etc.

The same would apply if the method is implemented in a general purpose search engine and/or related website. In an alternative implementation, the method may be implemented within a website (e.g. an online retailer) that allows customers to browse for and purchase various goods/service; then the purchase may take place wholly within that website.

The method may be one in which Pareto optimization is used as the multi-objective optimization process and then the set of goods and/or services reside on or define the Pareto front or envelope.

The method may be one in which the Pareto optimisation requires de-composing the optimisation problem into determining the Pareto front in a 2-axis domain, for example, price v quality (or price v pain).

The method may be one where a geometrical approach to identifying items on the Pareto front is used to identify a single instance of the goods and services that is the 'best'.

The method may be one in which the geometrical approach involves minimizing the value of the objective on one axis (typically price) per unit of the item on the other axis (e.g. quality).

The method may be one in which only that set of the 'best' goods or services generated by the multi-objective optimization process is displayed on an end-user's computing device to enable the end-user to view that 'best' set; other items not in that 'best' set are not displayed.

The method may be one in which the 'best' set can be discarded, for example by an end-user initiated process, and the 'next best' set generated by the multi-objective optimization process (e.g. Pareto optimization) is then displayed.

The method may be one in which the weighting or importance given to each of the different objectives can be varied automatically, depending on a specific user's history or demographic profile.

The method may be one where a machine learning system looks at how the user has interacted previously when looking at goods or services to purchase.

The method may be one in which the weighting or importance given to each of the different objectives can be varied: automatically, depending on attributes of the goods or services sought.

The method may be one in which the weighting or importance given to each of the different objectives can be varied automatically, depending on reported data.

The method may be one in which the weighting or importance given to each of the different objectives can be varied automatically, based on the behavior of other users.

The method may be one in which the weighting or importance given to each of the different objectives can be varied manually, with a user applying or setting various 'importance' weightings to various objectives.

The method may be one where the end-user's computer displays a UI including slider bars in relation to various objectives, to allow the end-user to set a weighting that can vary along a scale.

The method may be one applied to recommending e.g. in a web-based price comparison site, any of flights, hotels, car-hire.

The method may be one applied to recommending any type of goods or services that can be purchased on-line and that can be defined by multiple, competing objectives or attributes.

The method may be one implemented in a price comparison service, such as a dedicated price comparison website, in which case optimal flights, and/or hotels, and/or car-hire recommendations are provided directly on that website, and the end-user is then be taken to a different website to actually purchase the flights etc.

The method may be one implemented in a general purpose search engine website.

The method may be one implemented within a website (e.g. an online retailer) that allows customers to browse for and purchase various goods/service; then the purchase takes place wholly within that website.

According to a second aspect of the invention, there is provided a computer implemented system and apparatus for comparing goods and/or services from one or more websites or other on-line resource(s) in which one or more processors are programmed to implement a multi-objective optimization process that is used to identify a set of specific goods and/or services that optimally match user-defined and/or user-associated criteria and then data defining that set of specific goods and/or services is sent from a server and then displayed on an end-user's computing device to enable the end-user to view that set and optionally purchase one or more items from that set. An advantage is that an optimized set of goods and/or services may be transmitted more quickly to an end-user's computing device than a full set of goods and/or services, because the amount of data to be transmitted is reduced.

According to a third aspect of the invention, there is provided a method of reducing data transmission from a server to a user terminal, comprising the steps of:

(i) receiving at a server a request from a user terminal for search results for goods or services from one or more websites, databases or other on-line resources which satisfy search criteria;

(ii) the server searching the one or more websites, databases or other on-line resources for goods or services which satisfy the search criteria;

(iii) collecting at the server search results for goods or services which satisfy the search criteria;

(iv) processing at the server the collected goods or services search results to identify a Pareto optimized subset of the collected goods or services search results, and (v) transmitting to the user terminal the Pareto optimized subset of the collected goods or services search results instead of the collected goods or services search results.

An advantage is that the amount of data transmitted to the user terminal is reduced. A further advantage is that the network bandwidth required to transmit the data to the user terminal is reduced. A further advantage is that the amount of energy required to transmit the data to the user terminal is reduced. A further advantage is that the user terminal may receive the search results more quickly.

The method may be one wherein the Pareto optimized subset is a sample of an original Pareto optimized subset. An advantage is that the amount of data transmitted to the user terminal is reduced. A further advantage is that the network bandwidth required to transmit the data to the user terminal is reduced. A further advantage is that the amount of energy required to transmit the data to the user terminal is reduced. A further advantage is that the user terminal may receive the search results more quickly.

The method may be one in which the Pareto optimisation requires de-composing an optimisation problem into determining the Pareto front in a 2-axis domain, for example, price v quality (or price v pain).

The method may be one where a geometrical approach to identifying items on the Pareto front is used to identify a single instance of the goods and services that is the 'best'.

The method may be one in which the geometrical approach involves minimizing the value of the objective on one axis (typically price) per unit of the item on the other axis (e.g. quality).

The method may be one in which only that set of the 'best' goods or services generated by an optimization process is displayed on an end-user's computing device to enable the end-user to view that 'best' set; other items not in that 'best' set are not displayed.

The method may be one in which the 'best' set can be discarded, for example by an end-user initiated process, and the 'next best' set generated by the optimization process (e.g. Pareto optimization) is then displayed.

The method may be one in which the weighting or importance given to each of different objectives can be varied automatically, depending on a specific user's history or demographic profile.

The method may be one where a machine learning system looks at how the user has interacted previously when looking at goods or services to purchase.

The method may be one in which the weighting or importance given to each of different objectives can be varied: automatically, depending on attributes of the goods or services sought.

The method may be one in which the weighting or importance given to each of different objectives can be varied automatically, depending on reported data.

The method may be one in which the weighting or importance given to each of different objectives can be varied automatically, based on the behavior of other users.

The method may be one in which the weighting or importance given to each of different objectives can be varied manually, with a user applying or setting various 'importance' weightings to various objectives.

The method may be one where the end-user's computer displays a UI including slider bars in relation to various objectives, to allow the end-user to set a weighting that can vary along a scale.

The method may be one applied to recommending e.g. in a web-based price comparison site, any of flights, hotels, car-hire.

The method may be one applied to recommending any type of goods or services that can be purchased on-line and that can be defined by multiple, competing objectives or attributes.

The method may be one implemented in a price comparison service, such as a dedicated price comparison website, in which case optimal flights, and/or hotels, and/or car-hire recommendations are provided directly on that website, and the end-user is then be taken to a different website to actually purchase the flights etc.

The method may be one implemented in a general purpose search engine website.

The method may be one implemented within a website (e.g. an online retailer) that allows customers to browse for and purchase various goods/service; then the purchase takes place wholly within that website.

According to a fourth aspect of the invention, there is provided a server, the server connectable to a user terminal, the server configured to:

(i) receive a request from a user terminal for search results for goods or services from one or more websites, databases or other on-line resources which satisfy search criteria;

(ii) search the one or more websites, databases or other on-line resources for goods or services which satisfy the search criteria;

(iii) collect search results for goods or services which satisfy the search criteria;

(iv) process the collected goods or services search results to identify a Pareto optimized subset of the collected goods or services search results, and (v) transmit to the user terminal the Pareto optimized subset of the collected goods or services search results instead of the collected goods or services search results.

An advantage is that the amount of data transmitted to the user terminal is reduced. A further advantage is that the network bandwidth required to transmit the data to the user terminal is reduced. A further advantage is that the amount of energy required to transmit the data to the user terminal is reduced. A further advantage is that the user terminal may receive the search results more quickly.

According to a fifth aspect of the invention, there is provided a user terminal in connection with a server according to the fourth aspect of the invention, the user terminal in receipt of the Pareto optimized subset of the collected goods or services search results instead of the collected goods or services search results. An advantage is that the user terminal uses a reduced amount of energy in receiving and displaying the Pareto optimized subset of the collected goods or services search results instead of the collected goods or services search results. This is particularly advantageous if the user terminal is a battery powered mobile device, because battery charge is saved.

According to a sixth aspect of the invention, there is provided a computer program product executable on a server, the computer program product when executing on the server arranged to enable the server to:

(i) receive a request from a user terminal for search results for goods or services from one or more websites, databases or other on-line resources which satisfy search criteria;

(ii) search the one or more websites, databases or other on-line resources for goods or services which satisfy the search criteria;

(iii) collect search results for goods or services which satisfy the search criteria;

(iv) process the collected goods or services search results to identify a Pareto optimized subset of the collected goods or services search results, and (v) transmit to the user terminal the Pareto optimized subset of the collected goods or services search results instead of the collected goods or services search results.

According to a seventh aspect of the invention, there is provided a system including a server and a user terminal in connection with the server, in which (i) the server is configured to receive a request from the user terminal for search results for goods or services from one or more websites, databases or other online resources which satisfy search criteria;

(ii) the server is configured to search the one or more websites, databases or other online resources for goods or services which satisfy the search criteria;

(iii) the server is configured to collect search results for goods or services which satisfy the search criteria;

(iv) the server is configured to process the collected goods or services search results to identify a Pareto optimized subset of the collected goods or services search results, and (v) the server is configured to transmit to the user terminal the Pareto optimized subset of the collected goods or services search results instead of the collected goods or services search results.

BRIEF DESCRIPTION OF THE DRAWINGS

The above and other aspects of the invention will now be described, by way of example only, with reference to the following Figures, in which.

DETAILED DESCRIPTION

Given a collection of priced options as the result of a search, each with various attributes, those attributes are scored according to the degree of pain associated with specific values of the attribute. This scoring is either by manual input, or assigned dynamically as a result of other processes.

Cumulative pain can then be quantified for each search result, by calculating an assignment of pain both for discrete-valued attributes, and for attributes with continuous values, by taking into account the difference between the desired and actual values.

Figure 1:
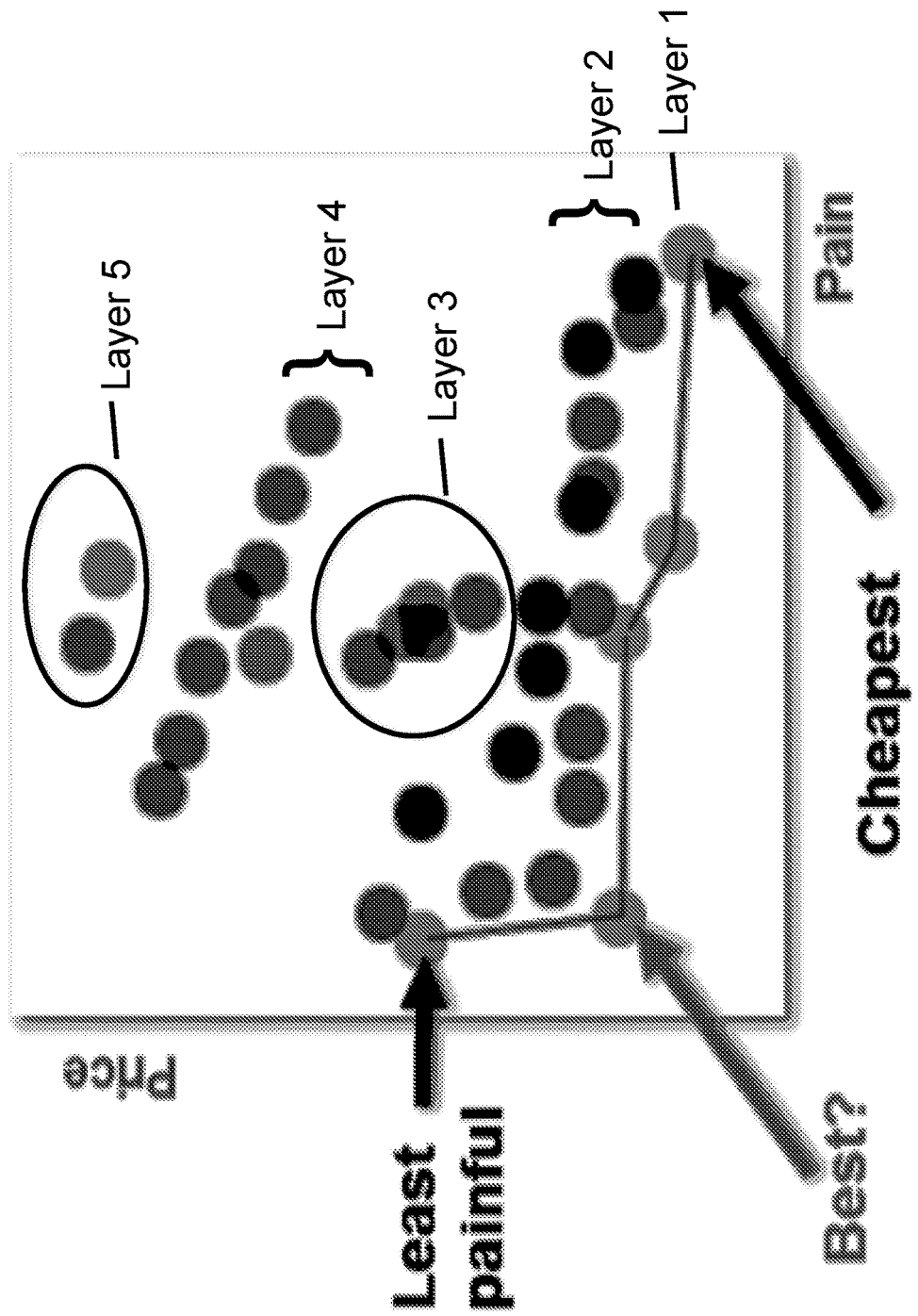
FIG. 1 shows an example of search results plotted for price against pain.

The diagram in FIG. 1 shows example results plotted for price against pain and will be referred to in the following descriptions.

The descriptions below are couched in abstract terms for generality, but our initial application of these ideas is to flight search. Itineraries returned from a search on dates and places are assigned pain according to attributes such as duration, number of stops, departure time or even airline or airport. As stated, this could be manual or automatic—for example, a user may choose to assign pain to arrival times beyond a certain point, or pain may be automatically assigned to certain airlines that are known to provide relatively poor service.

We may apply these concepts to our other products (car hire and accommodation), and believe the same techniques apply in many other contexts.

Reducing the Number of Search Results Presented to Users

The points on the line in FIG. 1, which make up Layer 1, represent what is known as the Pareto optimal front and are better than all the other results, because they are either the cheapest for a particular pain value, or the least painful for a particular price point.

Given a set of priced options as the result of a search, with cumulative pain assigned to each as described above, we can use the concept of Pareto optimality to give users an option to narrow results to only the best options, and then display those results that are on the Pareto optimal front.

Layers of Best Options in Search Results

This is a procedure to partition priced search results, with cumulative pain assigned to each as described above, into numbered layers. Layer N contains results that are better than all of the options in any layer>N. For example, layer 1 contains the set of best results, layer 2 the next best and so on. Layers can contain variable numbers of results.

Layers are derived by removing the results on the current Pareto optimal front, then re-calculating the front to give the next layer. Examples of layers are identified in FIG. 1 for illustration.

This allows users to choose to see the set of best results for consideration, then request to see the next best and so on, with confidence that at each stage all of the results being shown are better than all of those not yet seen.

Selection of Single Best Option from a Set of Search Results

Given cumulative pain and price for each search result, an algorithm has been created to select the single best result from those available such that it can be highlighted to users as preferable to all the others. This removes the problem for users of having to order on the basis of a single attribute (such as price), allowing all factors to be taken into consideration simultaneously. The method can be used irrespective of the number of search results available and even if a pain score is only assigned to a subset of the possible attributes for each result.

Figure 2:
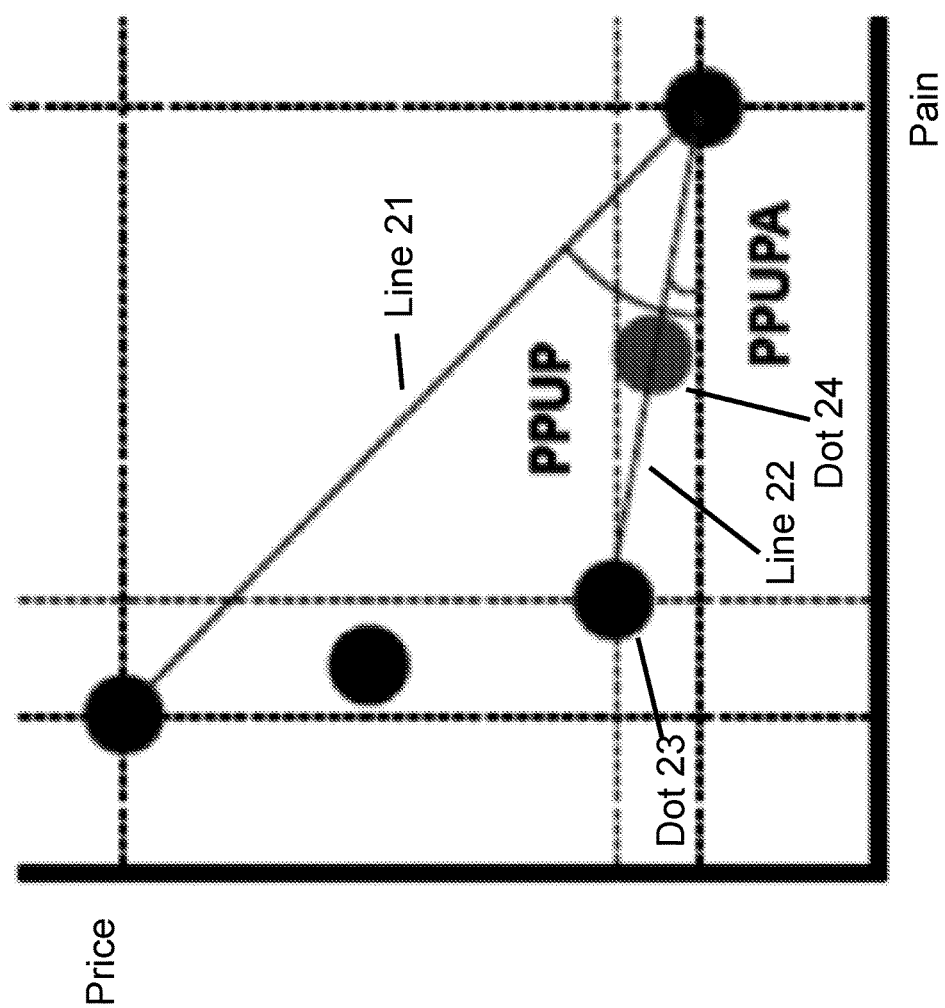
FIG. 2 shows an example of an analysis of search results plotted for price against pain.

The algorithm selects one of the options on the Pareto optimal front by minimising the price per unit of pain avoided (compared to the most painful option), and biasing towards least painful results. In the diagram in FIG. 2, the gradient of the line 21 equates to Price Per Unit of Pain (PPUP), the gradient of the line 22 equates to Price Per Unit of Pain Avoided. The dot 23 (result) minimises this gradient and has less pain associated than the dot 24, for only a small increase in price.

Ordering by Bestness

Given a set of priced options as the result of a search, with cumulative pain assigned to each as described above, an algorithm has been designed to dynamically assign a trade-off of pain against price, based on the characteristics of the particular set of search results under consideration.

Figure 3:
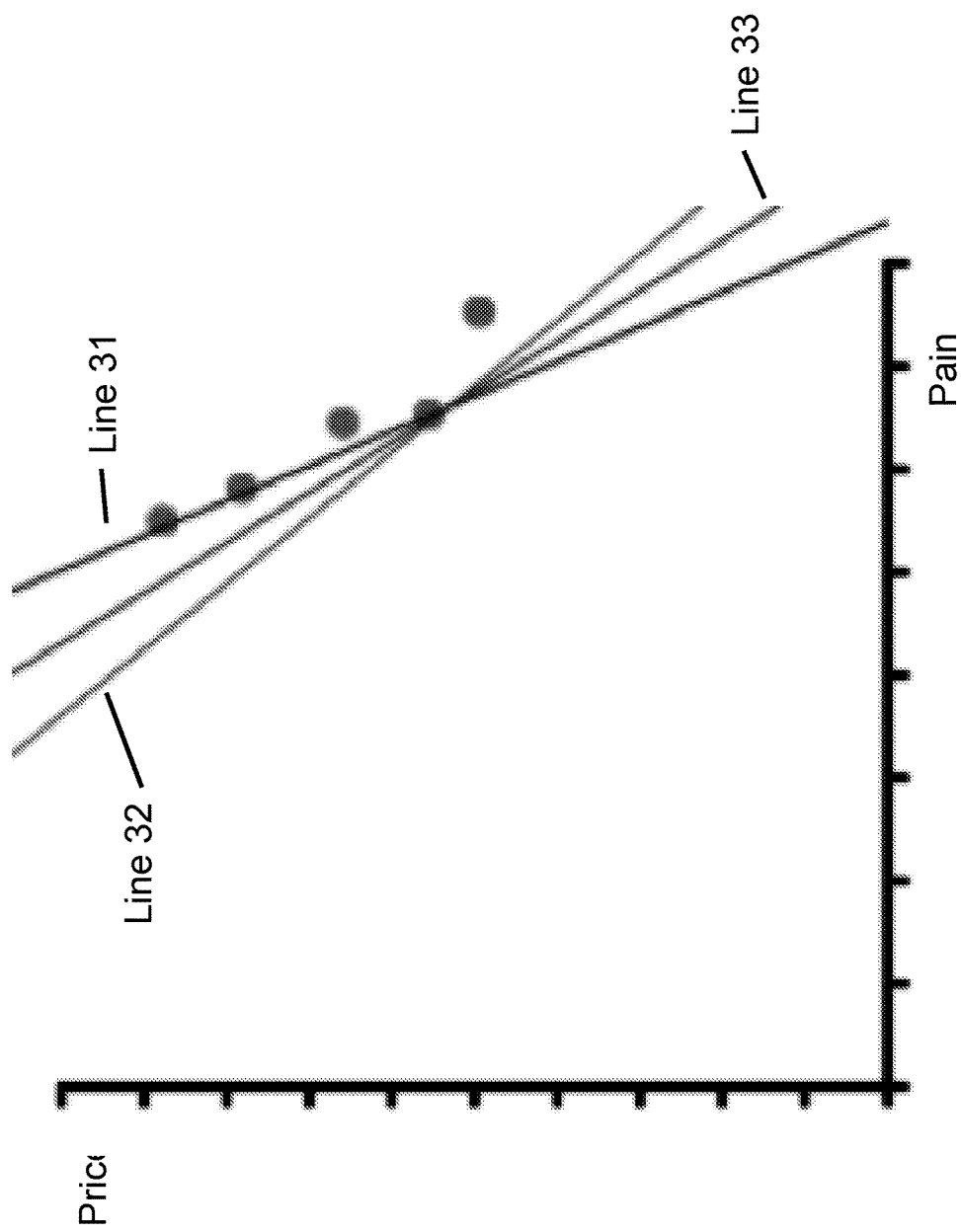
FIG. 3 shows an example of an analysis of search results plotted for price against pain.

The results in FIG. 3 show some results plotted for price against pain as before. We derive a trade-off value from the result selected as best (as above)—note that a particular trade-off value equates to the gradient of a line on the graph. The line 31 represents a trade-off calculated from the weighted average of the gradients of the two lines joining the best result to the results adjacent to it (weighted by their distance from the best). The trade-off represented by the line 32 is more biased towards the adjacent result to the top left (ie biasing lower pain as before); the line 33 is the average of the other two.

We have implemented an ordering based on the trade-off shown by the dots in FIG. 3.

This allows the results to be presented in order of bestness—such that the single best result (identified as described above) comes first, followed by the other options in decreasing order of desirability. This allows users to easily scroll through the available options in an order that exposes the best results first (for example, on the first visible page).

Figure 4:
FIG. 4 shows an example of search results.

Users searching for flights on the Skyscanner website http://www.skyscanner.net/ can be presented with a bewildering array of options. The screengrab in FIG. 4 shows a search for flights from London to New York with more than 1700 results. This means that the option a user ends up selecting could be buried many pages deep in those results.

The default ordering by price means that results on the first page often aren't that diverse, and many itineraries share the same outbound or inbound legs. Users are expected to manipulate the filter controls on the page to try and narrow down the visible results, however it can be difficult to quickly identify what represents a good option in a given context.

Quantifying the quality of the available options, and assessing the available trade-offs against price, lets us
- automatically narrow the options to a subset that is guaranteed to be better than any other option,
- progressively reveal the next best options,
- recommend a single option as best, and
- order all available options by a notion of bestness.

This means we can show far fewer results to users, and let them find better results more quickly.

We have expressed the methods and concepts above in abstract terms, because we believe the techniques could be applied in many more circumstances. In the concept of Skyscanner there are immediate applications in the context of booking flights, accommodation and car hire. However one may apply the same principles to presentation of products generally, in situations where there are many available options.

Reducing Data Transmission from a Server to a User Terminal

There is provided a method of reducing data transmission from a server to a user terminal. In an example, a server receives a request from a user terminal for search results for goods or services from one or more websites or databases or other online resources which satisfy search criteria. In response, the server may search the one or more websites or databases or other online resources for goods or services which satisfy the search criteria. The server may collect search results for goods or services which satisfy the search criteria. The server may process the collected goods or services search results to identify a Pareto optimized subset of the collected goods or services search results, and then transmit to the user terminal the Pareto optimized subset of the collected goods or services search results instead of the collected goods or services search results. An advantage is the amount of data transmitted from the server to the user terminal may be reduced substantially. Related advantages may include a reduced use of transmission network bandwidth, a reduced use of energy in transmitting the search results, and a reduced time for the user terminal to receive the search results.

Figure 5:
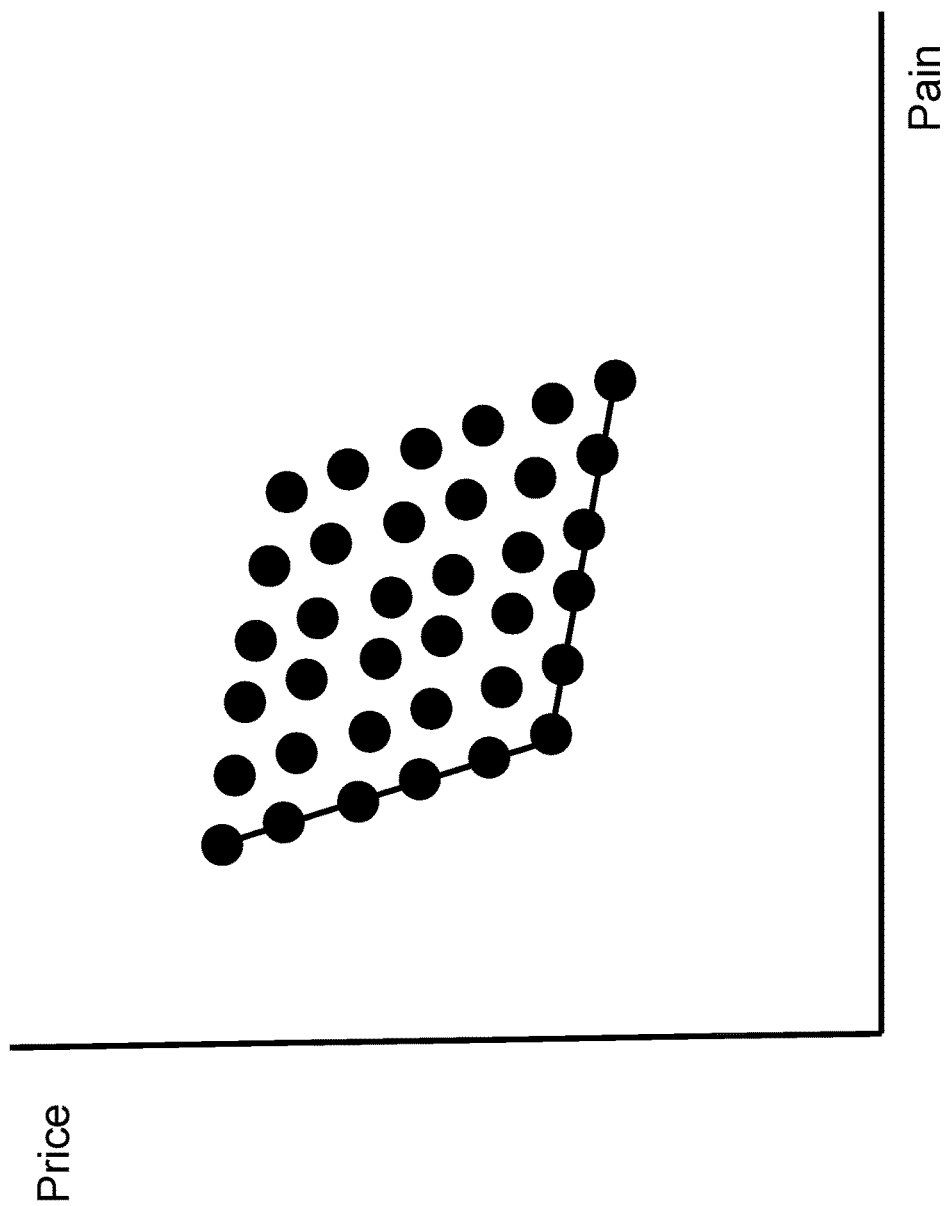
FIG. 5 shows an example of search results plotted for price against pain.

Simplifying somewhat, consider a case in which there are N search results which can be plotted on a two dimensional diagram similar to FIG. 1. An example is shown in FIG. 5, in which N=36. In FIG. 5, the members of the Pareto optimal front are joined by the indicated lines. Because the Pareto optimal front is a one dimensional system, whereas the whole system is two dimensional, the number of members of the Pareto optimal front scales roughly with $\sqrt{N}$. In FIG. 5, $\sqrt{N}=\sqrt{36}=6$. Because the point at which the two lines meet should not be counted twice, the number of members of the Pareto optimal front in FIG. 5 is 12−1=11, not 12. So for the example of FIG. 5, the number of search results in the Pareto optimized subset provides a reduction to 11 from 36 of the total number of search results. Therefore a substantial saving in data transmission of search results from a server to a user terminal can be obtained if the Pareto optimized subset is transmitted instead of all the search results.

Figure 6:
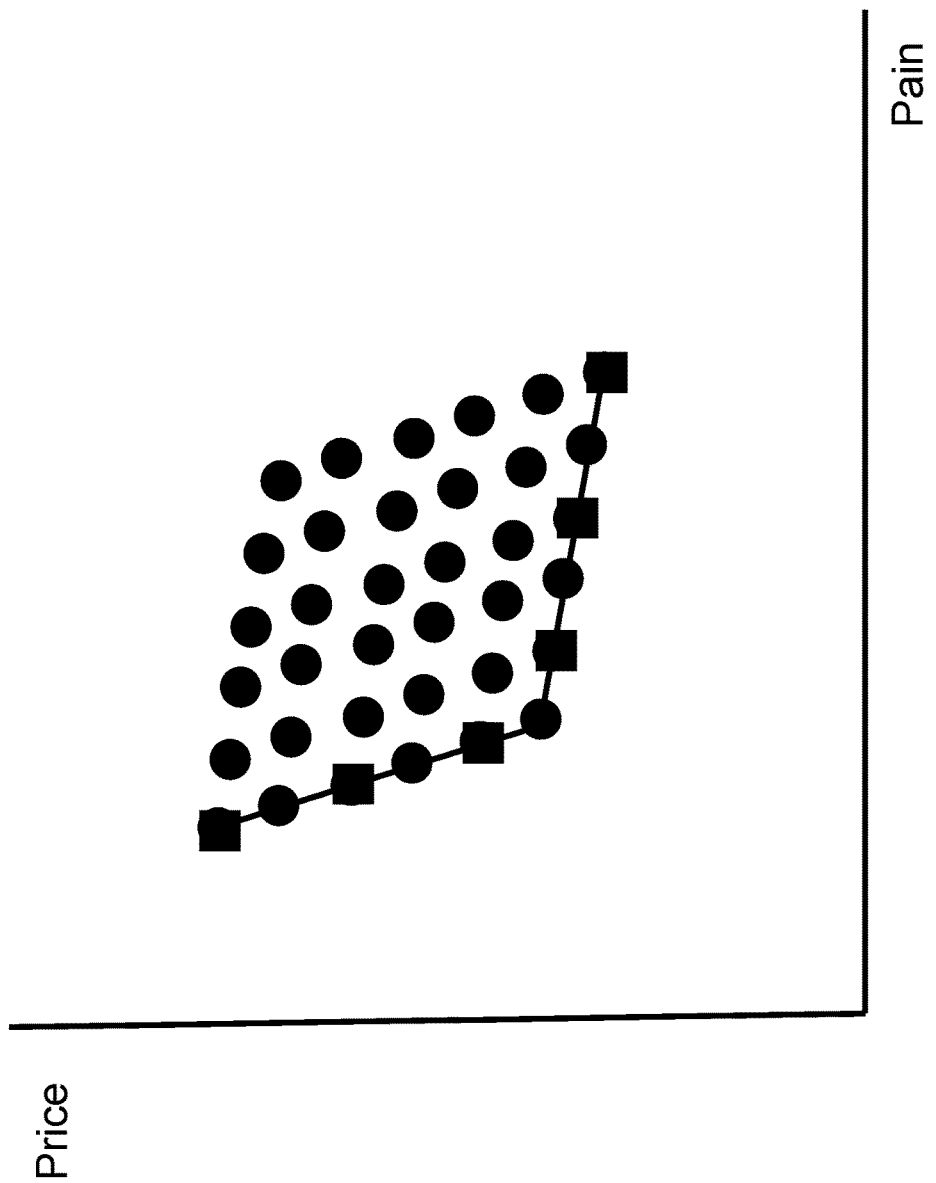
FIG. 6 shows an example of search results plotted for price against pain.

In an example, a sampled subset of the Pareto optimized subset may be transmitted, which provides a further reduction in the amount of data transmitted from the server to the user terminal. A sampled subset of the Pareto optimized subset may be referred to as a sampled Pareto optimized subset. For example, only every second member in the sequence of the Pareto optimized subset may be transmitted from a server to a user terminal. In the example of FIG. 6, only the results indicated by the squares on the Pareto optimal front, which are every second member of the Pareto optimal front, are transmitted from the server to the user terminal. So for the example of FIG. 6, the number of search results in the sampled Pareto optimized subset is a reduction to 6 from 36 of the total number of search results. Therefore a substantial saving in data transmission of search results from a server to a user terminal can be obtained if a sampled subset of the Pareto optimized subset is transmitted instead of all the search results.

The advantages of using a Pareto optimized subset to provide a substantial saving in data transmission of search results from a server to a user terminal increase with increasing number M of search results. For example, if M=100, a Pareto optimized subset (which may be a sample of an original Pareto optimized subset) might number approximately $\sqrt{M}=\sqrt{100}=10$. Hence a reduction in the number of transmitted search results from 100 to 10 is obtained, a saving of 90%. For example, if M=1000, a Pareto optimized subset (which may be a sample of an original Pareto optimized subset) might number approximately Int $(\sqrt{M})=\text{Int}(\sqrt{1000})=31$. Hence a reduction in the number of transmitted search results from 1000 to 31 is obtained, a saving of about 97%.

Figure 7:
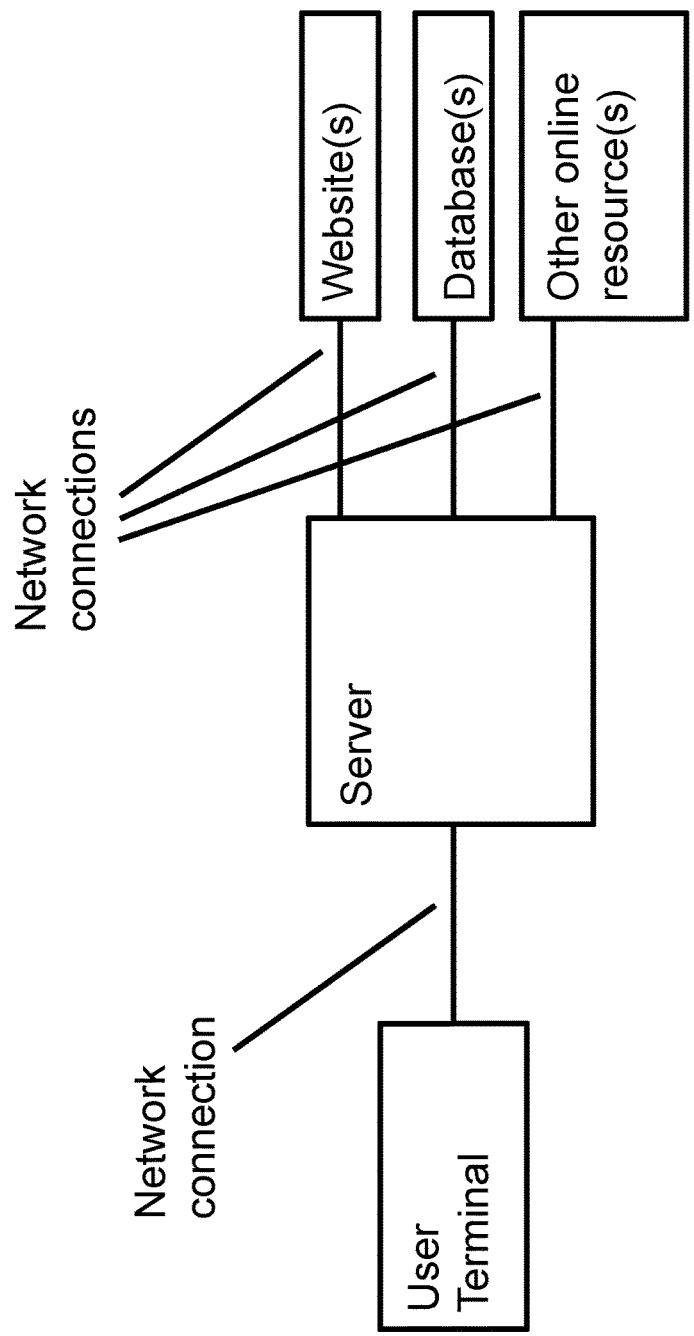
FIG. 7 shows an example of a system including a server and a user terminal in connection with the server, in which the server is configured to receive a request from the user terminal for search results for goods or services from one or more websites, databases or other online resources which satisfy search criteria.

There is provided a system including a server and a user terminal in connection with the server, in which (i) the server is configured to receive a request from the user terminal for search results for goods or services from one or more websites, databases or other online resources which satisfy search criteria;

(ii) the server is configured to search the one or more websites, databases or other online resources for goods or services which satisfy the search criteria;

(iii) the server is configured to collect search results for goods or services which satisfy the search criteria;

(iv) the server is configured to process the collected goods or services search results to identify a Pareto optimized subset of the collected goods or services search results, and (v) the server is configured to transmit to the user terminal the Pareto optimized subset of the collected goods or services search results instead of the collected goods or services search results. An advantage is the amount of data transmitted from the server to the user terminal may be reduced substantially. Related advantages may include a reduced use of transmission network bandwidth, a reduced use of energy in transmitting the search results, and a reduced time for the user terminal to receive the search results. An example is shown in FIG. 7.

User terminals may be desktop computers, laptop computers, smartphones, tablet computers, or smart TVs for example. User terminals may be connected to a server by a wireless network connection, by a physical network connection, or by a combination of wireless and physical network connection or connections. User terminals may be battery powered or powered by mains electricity.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of comparing goods and/or services from one or more web sites or other on-line resource(s), and of reducing data transmission from a server to an end-user's computing device, the method comprising the steps of:

(i) receiving at the server a request from the end-user's computing device for search results for goods or services from one or more websites, databases or other on-line resources which satisfy search criteria;

(ii) the server searching the one or more websites, databases or other on-line resources for goods or services which satisfy the search criteria;

(iii) collecting at the server a plurality of search results for goods or services which satisfy the search criteria;

(iv) processing at the server the collected plurality of goods or services search results wherein Pareto optimization is used for the collected plurality of goods or services search results to identify a Pareto optimized subset of the collected plurality of goods or services search results which is smaller than the collected plurality of goods or services search results, and (v) transmitting to the end-user's computing device the Pareto optimized subset of the collected plurality of goods or services search results instead of the collected plurality of goods or services search results.

2. The method of claim 1 in which Pareto optimization is used as a multi-objective optimization process and then the Pareto optimized subset of the collected plurality of goods or services resides on or defines a Pareto front or envelope.

3. The method of claim 2 in which the Pareto optimisation requires de-composing the optimisation problem into determining the Pareto front in a 2-axis domain.

4. The method of claim 3 where a geometrical approach to identifying items on the Pareto front is used to identify a single instance of the goods and services that is the 'best'.

5. The method of claim 4 in which the geometrical approach involves minimizing the value of the objective on one axis per unit of the item on the other axis.

6. The method of claim 2 in which only that set of the 'best' goods or services generated by the multi-objective optimization process is displayed on the end-user's computing device to enable the end-user to view that 'best' set; other items not in that 'best' set are not displayed.

7. The method of claim 6 in which the 'best' set can be discarded, by an end-user initiated process, and the 'next best' set generated by the Pareto optimization process is then displayed.

8. The method of claim 2 in which weighting given to each of the different objectives can be varied automatically, depending on a specific user's history or demographic profile.

9. The method of claim 8 where a machine learning system looks at how the user has interacted previously when looking at goods or services to purchase.

10. The method of claim 2 in which a weighting given to each of the different objectives can be varied: automatically, depending on attributes of the goods or services sought.

11. The method of claim 2 in which a weighting given to each of the different objectives can be varied automatically, depending on reported data.

12. The method of claim 2 in which a weighting given to each of the different objectives can be varied automatically, based on the behavior of other users.

13. The method of claim 2 in which a weighting given to each of the different objectives can be varied manually, with a user applying or setting various 'importance' weightings to various objectives.

14. The method of claim 13 where the end-user's computer displays a user interface (UI) including slider bars in relation to various objectives, to allow the end-user to set a weighting that can vary along a scale.

15. The method of claim 1 applied to recommending in a web-based price comparison site, any of flights, hotels, car-hire.

16. The method of claim 1 applied to recommending any type of goods or services that can be purchased on-line and that can be defined by multiple, competing objectives or attributes.

17. The method of claim 1 implemented in a price comparison service, such as a dedicated price comparison website, in which case optimal flights, and/or hotels, and/or car-hire recommendations are provided directly on that website, and the end-user is then taken to a different website to actually purchase the flights and/or hotels, and or car-hire.

18. The method of claim 1 implemented in a general purpose search engine website.

19. The method of claim 1 implemented within an online retailer website that allows customers to browse for and purchase various goods/service; then the purchase takes place wholly within that website.

20. A server for comparing goods and/or services from one or more websites or other on-line resource(s) in which one or more processors are programmed to implement a multi-objective optimization process that is used to:
 (a) identify a set of specific goods and/or services that optimally match user-defined and/or user-associated criteria and then
 (b) data defining a Pareto optimized subset of that set of specific goods and/or services is sent from the server and then displayed on an end-user's computing device to enable the end-user to view that set and optionally purchase one or more items from that set;
 the server connectable to the end-user's computing device, the server configured to:
 (i) receive a request from the end-user's computing device for search results for goods or services from one or more websites, databases or other on-line resources which satisfy search criteria;
 (ii) search the one or more websites, databases or other on-line resources for goods or services which satisfy the search criteria;
 (iii) collect a plurality of search results for goods or services which satisfy the search criteria;
 (iv) process the collected plurality of goods or services search results wherein Pareto optimization is used for the collected plurality of goods or services search results to identify the Pareto optimized subset of the collected plurality of goods or services search results which is smaller than the collected plurality of goods or services search results; and
 (v) transmit to the end-user's computing device the Pareto optimized subset of the collected plurality of goods or services search results instead of the collected plurality of goods or services search results.

21. A computer program product stored on a non-transitory machine-readable medium, the computer program product executable on a server, the computer program product when executing on the server arranged to enable the server to:
 (i) receive a request from a user terminal for search results for goods or services from one or more websites, databases or other on-line resources which satisfy search criteria;
 (ii) search the one or more websites, databases or other on-line resources for goods or services which satisfy the search criteria;
 (iii) collect a plurality of search results for goods or services which satisfy the search criteria;
 (iv) process the collected plurality of goods or services search results wherein Pareto optimization is used for the collected plurality of goods or services search results to identify a Pareto optimized subset of the collected plurality of goods or services search results which is smaller than the collected plurality of goods or services search results, and
 (v) transmit to the user terminal the Pareto optimized subset of the collected plurality of goods or services search results instead of the collected plurality of goods or services search results.

22. The method of claim 1, wherein the Pareto optimized subset is a sample of an original Pareto optimized subset.

23. The method of claim 1, wherein the goods or services are flights, car-hire or hotels.

24. The server of claim 20, wherein the Pareto optimized subset is a sample of an original Pareto optimized subset.

25. The server of claim 20, wherein the goods or services are flights, car-hire or hotels.

* * * * *